(12) United States Patent
Zhong

(10) Patent No.: US 12,101,005 B2
(45) Date of Patent: Sep. 24, 2024

(54) ELECTRICAL SHUNT DEVICE

(71) Applicant: Schaeffler Technologies AG & Co. KG, Herzogenaurach (DE)

(72) Inventor: Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 233 days.

(21) Appl. No.: 17/894,274

(22) Filed: Aug. 24, 2022

(65) Prior Publication Data

US 2024/0072618 A1 Feb. 29, 2024

(51) Int. Cl.
*H02K 11/40* (2016.01)
*F16C 41/00* (2006.01)
*H02K 7/08* (2006.01)
*H02K 5/173* (2006.01)

(52) U.S. Cl.
CPC ............ *H02K 11/40* (2016.01); *F16C 41/002* (2013.01); *H02K 7/08* (2013.01); *H02K 5/1732* (2013.01)

(58) Field of Classification Search
CPC .......... H02K 5/173; H02K 7/08; H02K 11/40; F16C 41/002
See application file for complete search history.

(56) References Cited

U.S. PATENT DOCUMENTS

| 3,271,723 A | 9/1966 | Willing |
| 3,564,477 A | 2/1971 | Pompei |
| 4,801,270 A | 1/1989 | Scarlata |
| 7,136,271 B2 | 11/2006 | Oh et al. |
| 7,193,836 B2 | 3/2007 | Oh et al. |
| 7,339,777 B2 * | 3/2008 | Barnard ................. H01R 39/64 361/212 |
| 8,764,301 B2 | 7/2014 | Winkelmann et al. |
| 9,175,728 B2 | 11/2015 | White |
| 9,581,203 B2 * | 2/2017 | White ................. F16C 33/7823 |
| 9,653,193 B2 | 5/2017 | Windrich et al. |
| 10,190,640 B2 * | 1/2019 | Hutchison ............ F16C 41/002 |
| 10,253,818 B1 | 4/2019 | Ince et al. |
| 2006/0007609 A1 | 1/2006 | Oh et al. |
| 2016/0238074 A1 | 8/2016 | Preis et al. |

* cited by examiner

*Primary Examiner* — Jue Zhang

(74) *Attorney, Agent, or Firm* — Volpe Koenig

(57) ABSTRACT

A shunt assembly for an open bearing including an annular shunt device having a plurality of through slots for passing lubricant and the annular shunt device being configured to engage a first bearing ring, a clamping ring seated against a second bearing ring within an inner diameter of the annular shunt device. The shunt assembly also includes a carbon fiber layer seated against a radially inner surface and an axially outer surface at least two surfaces of the clamping ring, the carbon fiber layer contacting the annular shunt device and a bracket partially enclosing the carbon fiber layer against the clamping ring, the bracket being configured to engage the second bearing ring, wherein the annular shunt device, the bracket, and the carbon fiber layer are configured to provide an electrically conductive pathway between the bearing rings.

20 Claims, 6 Drawing Sheets

ELECTRICAL SHUNT DEVICE

FIELD OF INVENTION

The present disclosure relates generally to a shunt device for bearings, and more particularly to an inverted electrical shunt device for high speed application bearings.

BACKGROUND

In automotive hybrid and e-axles, stray electrical current from drive motors are an issue which can cause electrical arching, pitting, and other damage to bearings. Also, newer e-axles are using motors that require higher speeds, requiring higher voltage power for the e-axle, and demanding even higher-speed electrical shunt devices to safely pass electrical current to ground, and protect bearing raceways and rolling elements from electrical discharge machining (EDM) in a wet, automatic transmission fluid (ATF) lubricated environment.

Electrical shunts typically operate in applications that are dry or sealed from lubricants or in open, non-sealed environments, however none operate in a high-speed shunt applications having a motor speed of 11,000 RPM or higher. Shunt devices also typically include a carbon fiber layer to help transmit current for its high electrical conductivity, high mechanical strength, and high wear-resistance but these known carbon fiber threads and layers can be pushed away from the contact surface by lubricant under speeds higher than 11,000 rpm.

While conventional shunts and shunt components have generally been considered satisfactory for their intended purpose, there is still a need in the art for improved shunts and shunt assemblies that provide improved performance, especially at high rotational speeds. The present disclosure provides a solution for this need.

SUMMARY

A shunt assembly for an open bearing is disclosed. The shunt assembly includes an annular shunt device having a plurality of through slots configured for passing lubricant, and the annular shunt device is configured to engage a first bearing ring. A clamping ring and a carbon fiber layer seated against at least two surfaces of the clamping ring are also provided. The carbon fiber layer contacts the annular shunt device, and a bracket partially encloses the carbon fiber layer against the clamping ring. The bracket is configured to engage the second bearing ring, wherein the annular shunt device, the bracket, and the carbon fiber layer are configured to provide an electrically conductive pathway between the bearing rings.

It is also considered that the carbon fiber layer can define an L-shaped cross-section having an axial element and a radial element, and at least a portion of both the axial element and the radial element can be clamped between the clamping ring and the bracket. The radial element of the carbon fiber layer can contact the annular shunt device. The bracket and the carbon fiber layer can be joined using an epoxy, which can be electrically conductive. The clamping ring can be spaced away from the annular shunt device.

It is also considered that an axial element of the shunt device can include a plurality of protrusions directed radially inward and configured to engage the carbon fiber layer. The carbon fiber layer can contact the axial element of the shunt device. The carbon fiber layer can contact the plurality of protrusions of the shunt device. The shunt device can be formed from steel and be coated with a layer including silver.

It is also considered that the plurality of through slots can be circumferentially spaced about a central radial portion and define between 20% and 50% of the central radial portion. The clamping ring can be located within an inner diameter of the annular shunt device.

A bearing assembly is also disclosed. The bearing assembly includes an outer ring, an inner ring, and a plurality of rolling elements disposed between the outer ring and the inner ring. A bearing cage can be provided for securing each of the plurality of rolling elements disposed between the outer ring and the inner ring on an axially inward side of the plurality of rolling elements. A shunt assembly can be located on an axially outer side of the plurality of rolling elements. The shunt assembly includes an annular shunt device, formed from a conductive material, having a plurality of through slots configured for passing lubricant to the rolling elements, a clamping ring seated within an inner diameter of the annular shunt device and, a carbon fiber layer seated on a radially inner surface and an axially outer surface of the clamping ring. The carbon fiber layer contacts the annular shunt device and a bracket partially enclosing the carbon fiber layer against the clamping ring.

It is also considered that the annular shunt device can be pressed against a radial surface of the outer ring and wherein the annular shunt device is pressed against an axial surface of the outer ring. The bracket can be pressed against the inner ring. The annular shunt device, the carbon fiber layer, and the bracket can be configured to establish an electrical passage between the inner ring and the outer ring.

It is also considered that the bearing assembly can be an open bearing. The carbon fiber layer can be spaced away from the outer ring and from the inner ring. The bearing assembly can be configured to operate at least 11,000 rpm.

It is also considered that the shunt device can include a first axial element, a central radial portion connected to the first axial element, and a second axial element connected to the central radial portion to define a generally C-shaped cross-section, wherein the carbon fiber layer includes a radial element and an axial element, wherein the radial element can contact the second axial element of the shunt device.

It is noted that one or more of the optional features noted above may be used alone or in various combinations with one another in connection with the basic bearing assembly and associated sealing arrangement.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
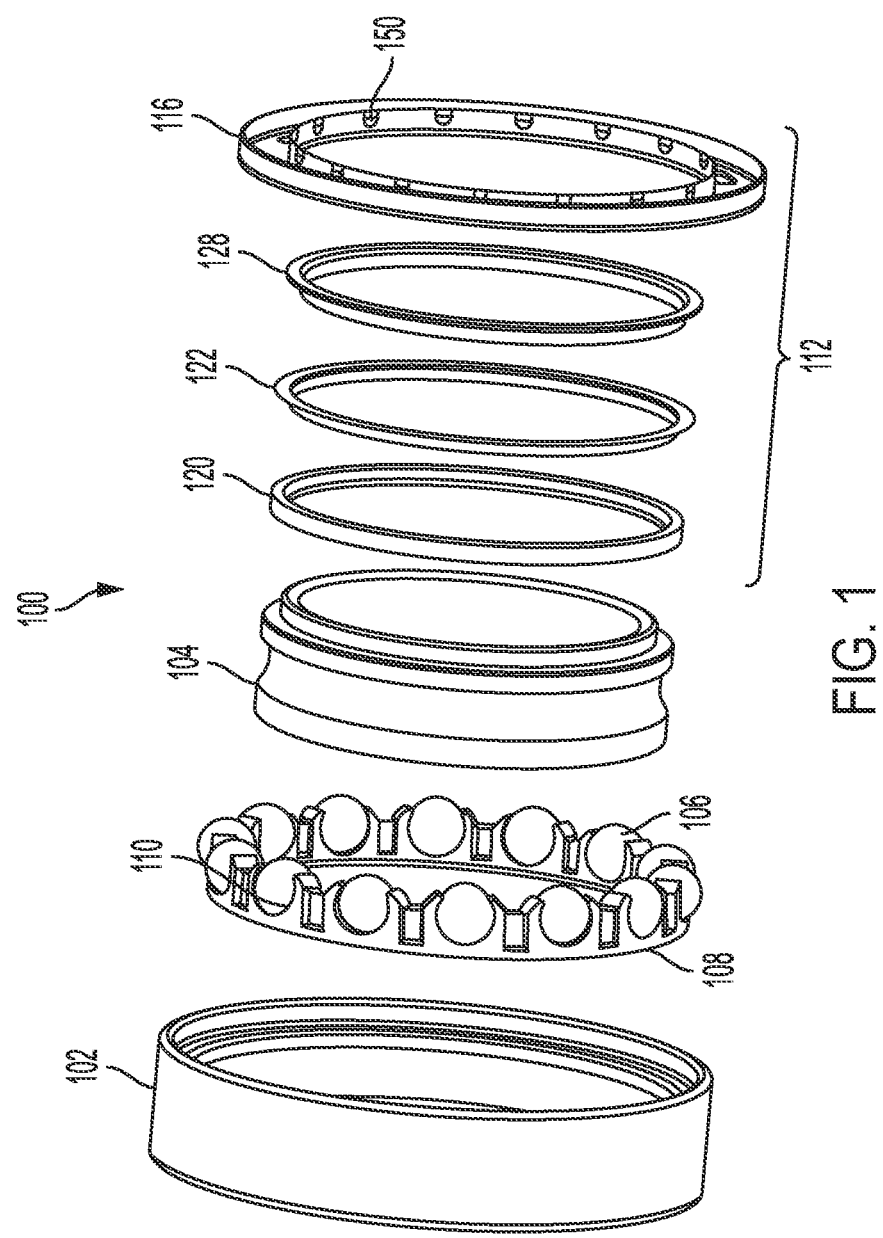
FIG. 1 is an exploded view illustrating a bearing assembly according to one embodiment of the disclosure.
Figure 2:
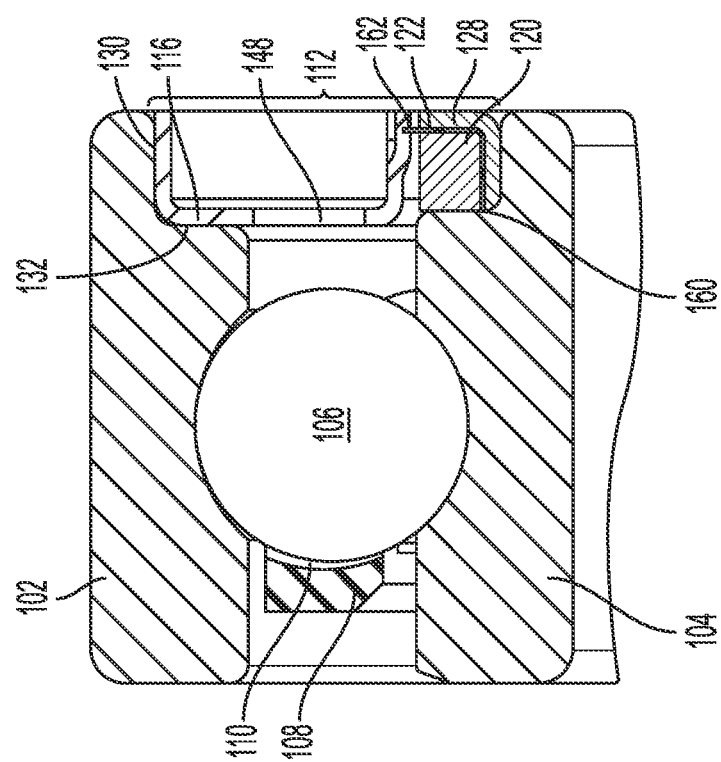
FIG. 2 is a cross-sectional view of the bearing assembly of FIG. 1.
Figure 3C:
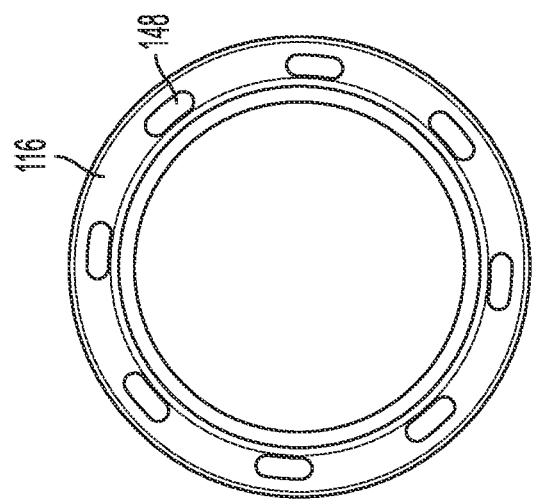
FIG. 3C is a front view of the shunt device of FIG. 3A.
Figure 3B:
FIG. 3B is a cross-sectional view of the shunt device of FIG. 3A.
Figure 3A:
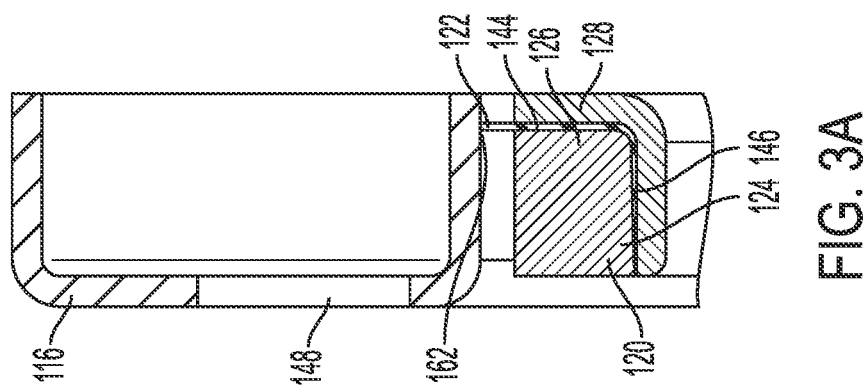
FIG. 3A is cross-sectional view of shunt assembly of another embodiment.
Figure 4:
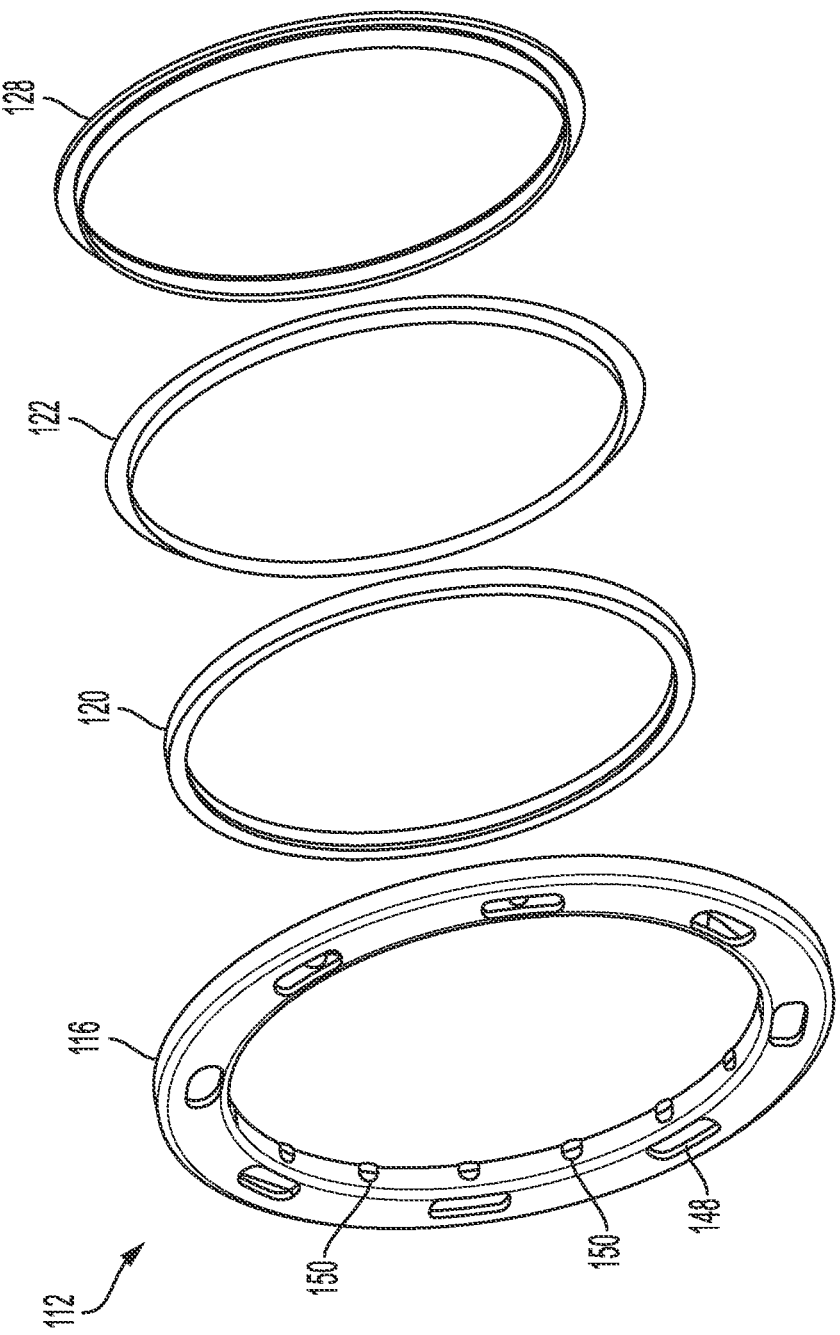
FIG. 4 is an exploded view of the shunt assembly of FIG. 1.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b. This would also apply to lists of three or more items in like manner so that individual ones of the items or combinations thereof are included. The terms "about" and "approximately" encompass+ or −10% of an indicated value unless otherwise noted. The terminology includes the words specifically noted above, derivatives thereof and words of similar import.

Reference will now be made to the drawings wherein like reference numerals identify similar structural features or aspects of the subject disclosure. For purposes of explanation and illustration, and not limitation, a system view of an exemplary embodiment of the bearing assembly in accordance with the disclosure is shown in FIG. 1 and is designated generally by reference character 100. Other embodiments of the assembly in accordance with the disclosure, or aspects thereof, are provided in FIGS. 2-6C, as will be described. The assemblies described herein can be used to improve shunts and shunt assemblies with improved performance, especially at high rotational speeds and in electrical vehicle environments. The features described below may be applied to various types of bearings, however the below examples focus on a ball bearing, having an inner ring, an outer ring, with a ball and cage assembly.

FIG. 1 shows an exploded view a deep groove ball bearing assembly 100. The bearing assembly 100 includes a fixed outer ring 102, a rotating inner ring 104, a plurality of rolling elements 106 disposed between the outer ring 102 and the inner ring 104. In another configuration, the outer ring 102 can be rotating and the inner ring 104 can be fixed. A bearing cage 108 is used for securing the rolling elements 106 on an axially inward side 110 of the plurality of rolling elements 106, thereby making the bearing assembly 100 an open bearing assembly.

A shunt assembly 112 is located on an axially outer side of the plurality of rolling elements 106, opposite the bearing cage 108. The shunt assembly 112 is made up of an annular shunt device 116/116', a clamping ring 120, a carbon fiber layer 122, and a bracket 128. The shunt device 116/116' is press fit into the outer ring 102 to ensure reliable contact between the shunt device 116/116' and the outer ring 102. Similarly, the bracket 128 can be press fit onto the inner ring 104 for reliable contact. The shunt assembly 112 provides protection of the bearing against electrical arching damage to the raceway by establishing an electrically conductive pathway or connection between the outer ring 102 and the inner ring 104 and allows a safe passage of electrical current to ground. Also, bearing raceways and rolling elements are protected from electrical discharge damage, and allow the bearing to be lubricated by ATF flowing through the bearing, in a wet lubricate ATF environment.

The shunt devices 116 (shown in FIGS. 3A-3C and 5A-5C) and 116' (shown in FIGS. 1, 2, 4, and 6A-6C) include a plurality of through slots 148 for passing lubricant to the rolling elements 106. The shunt devices 116, 116' can have a C-shaped cross-sectional profile. The clamping ring 120 can be seated within an inner diameter of the annular shunt device 116/116' and can contact an axially outward facing surface 160 of the inner ring 104. The shunt device 116/116' and the bracket 128 can be made from steel, and can also include a coating, such as a silver coating. One of ordinary skill in the art would understand that the conductive materials to form these two components can be different.

The carbon fiber layer 122 can have an L-shaped cross-section, including a radial element 144 and an axial element 146. One of ordinary skill in the art would understand that the exact shape or profile of the carbon fiber layer 122 can vary. In one arrangement, the carbon fiber layer 122 can be seated on or directly contact a radially inner surface 124 (shown in FIG. 3A) and an axially outer surface 126 of the clamping ring 120. A radially distal or terminal end 162 of the carbon fiber layer 122 can contact the annular shunt device 116/116' at an inner diameter or radially inner surface of the annular shunt device 116/116' thereby ensuring a conductive path. In one example, an entirety of the radial element 144 of the carbon fiber layer 122 is contacted by both the clamping ring 120 and the bracket 128.

The bracket 128 can partially enclose the carbon fiber layer 122 from at least two sides against the clamping ring 120, while allowing the radially distal end 162 of the carbon fiber layer 122 to protrude and contact the annular shunt device 116/116'. The annular shunt device 116/116', the carbon fiber layer 122, and the bracket 128 establish an electrical passage between the inner ring 104 and the outer ring 102.

The carbon fiber layer 122 is used to establish and maintain a reliable electrically conductive pathway between the bracket 128 and the shunt device 116/116'. Unlike typical shunt devices, instead of a carbon fiber layer being placed on a stationary outer ring side, the carbon fiber layer 122 is placed closer to the rotating inner ring 104. Because of this configuration, centrifugal forces at high rotational speeds (>11,000 rpm) helps ensure contact between the carbon fiber layer 122 and the outer ring 102. This way, the shunt assembly 112 can work in a much higher speed application.

In the bearing assembly 100, the annular shunt device 116/116' can be pressed against a radial surface 130 of the outer ring 102 and against an axial surface 132 of the outer ring 102. The bracket 128 can be pressed against the inner ring 104. Press-fit connections can thereby be provided between the annular shunt device 116/116' and the outer ring 102, as well as the bracket 128 and the inner ring 104. The outer ring 102 and the inner ring 104 can each include shoulders or other structures to provide axial abutment surfaces for the annular shunt device 116/116' and the bracket 128. One of ordinary skill in the art would understand that other connections can be formed between these respective components.

The bracket 128 and the carbon fiber layer 122 can be fixed or connected to each other. In one example, the bracket 128 and the carbon fiber layer 122 are joined using an epoxy. The epoxy can be electrically conductive. The clamping ring 120 can be spaced away from and not in contact with the annular shunt device 116/116'. The clamping ring 120 can be pressed into the bracket 128 to secure the carbon fiber layer 122, and the bracket 128 can then be pressed onto the inner ring 104.

As shown in FIGS. 5A-6C, the shunt devices 116/116' can include a first axial element 134, a central radial portion 138 connected to the first axial element 134, and a second axial element 142 connected to the central radial portion 138 to define a generally C-shaped cross-section. The second axial element 142 defines an inner diameter or radially inner surface of the shunt device 116/116', wherein the radial element 144 of the carbon fiber layer 122 can contact the second axial element 142 of the shunt device. In one example, the carbon fiber layer 122 only contacts the axial element 142 of the shunt device. This highly conductive shunt device safely conducts current to ground, preventing electrical discharge machining (EDM) damage to the bearing. The plurality of through slots 148 can be circumferentially spaced, evenly, about the central radial portion 138. The plurality of through slots 148 can define between 20% and 50% of the central radial portion 138 by area.

Figure 5C:
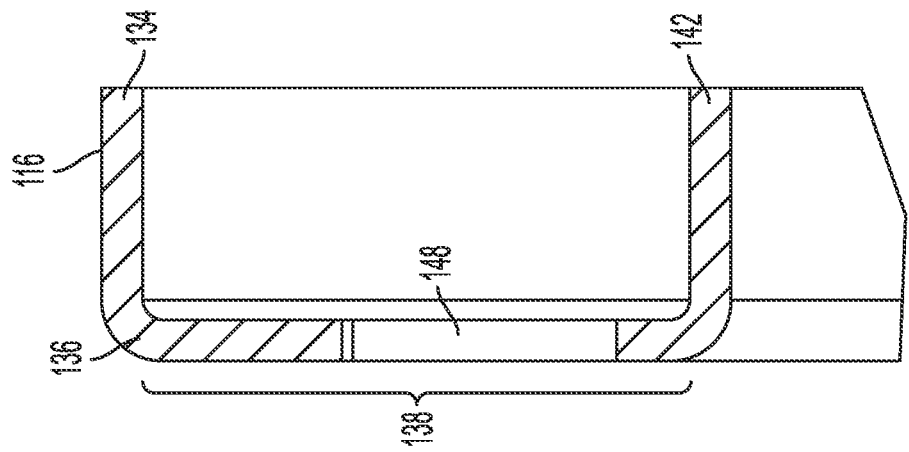
FIG. 5C shows an enlarged view of an embodiment of a shunt device of FIG. 3A.
Figure 5B:
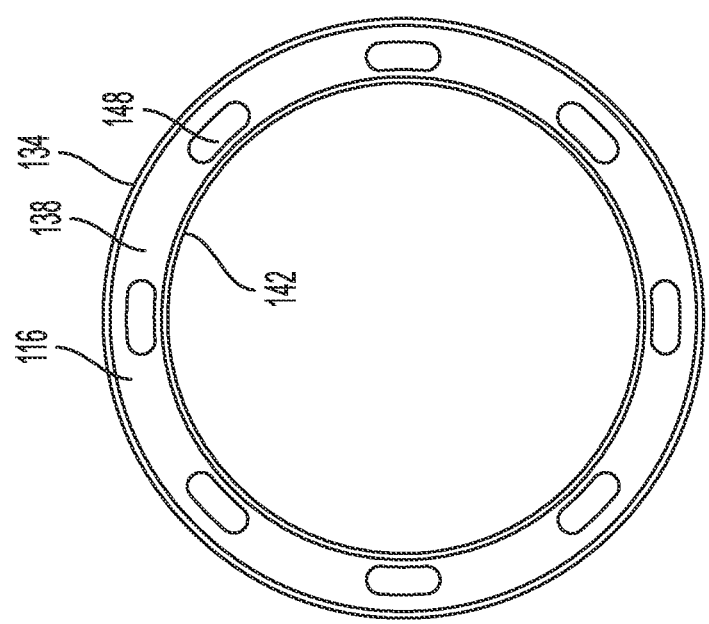
FIG. 5B shows a front view of an embodiment of a shunt device of FIG. 3A.
Figure 5A:
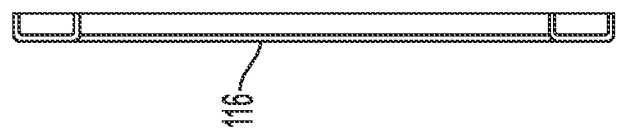
FIG. 5A shows a cross-sectional view of an embodiment of a shunt device of FIG. 3A.
Figure 6C:
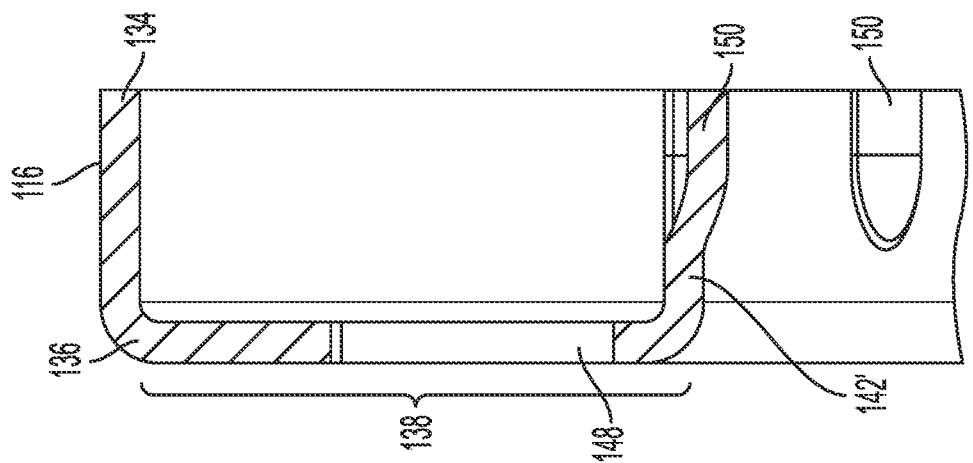
FIG. 6C shows an enlarged view of the shunt device of FIG. 1.
Figure 6B:
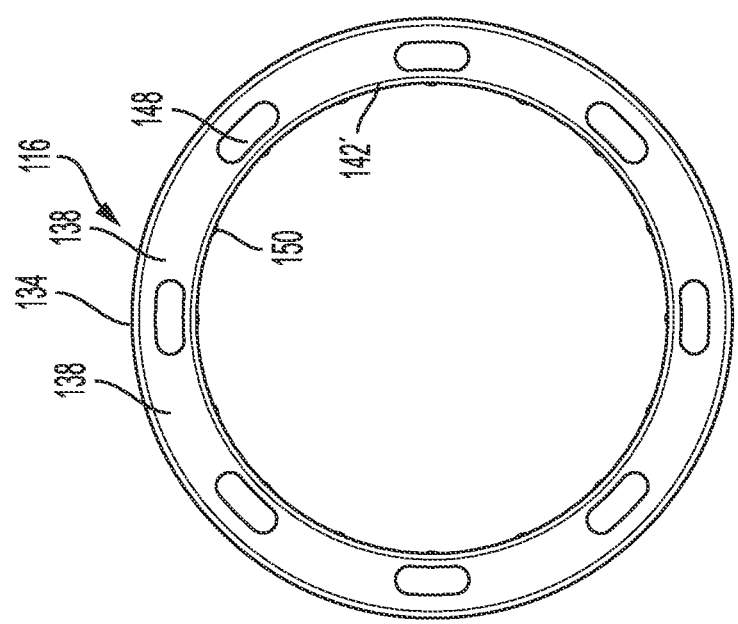
FIG. 6B shows a front view of the shunt device of FIG. 1.
Figure 6A:
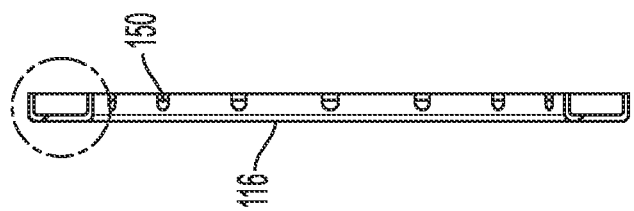
FIG. 6A shows a cross-sectional view of a shunt device of FIG. 1.

In one embodiment of the disclosure, as shown in FIGS. 5A-5C, the second axial element 142 of the shunt device 116 is straight. In another embodiment of the disclosure, as shown in FIGS. 6A-6C, the second axial element 142' of the shunt device 116' includes contact bumps or protrusions 150, which allows for improved contact with the carbon fiber layer 122.

The systems of the present disclosure, as described above and shown in the drawings, provide for a bearing arrangement and shunt assembly with superior properties, allowing for a longer useful life due to both passable lubrication and a consistent grounding effect for electrical components.

Having thus described the exemplary embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the disclosed embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LOG OF REFERENCE NUMERALS assembly 100
outer ring 102
inner ring 104
rolling elements 106
cage 108
rolling element inward side 110
shunt assembly 112
annular shunt device 116, 116'
clamping ring 120
carbon fiber layer 122
clamping ring radially inner surface 124
clamping ring axially outer surface 126
bracket 128
outer ring radial surface 130
outer ring axial surface 132
shunt device first axial element 134
shunt device central radial portion 138
shunt device second axial element 142, 142'
carbon fiber layer radial element 144
carbon fiber layer axial element 146
shunt device slots 148
protrusions 150
carbon fiber distal end 162

What is claimed is:

1. A shunt assembly for an open bearing, the shunt assembly comprising:
    an annular shunt device having a plurality of through slots configured for passing lubricant, the annular shunt device being configured to engage a first bearing ring;
    a clamping ring;
    a carbon fiber layer seated against at least two surfaces of the clamping ring, the carbon fiber layer being comprised of an axial element and a radial element, the carbon fiber layer contacting the annular shunt device; and
    a bracket partially enclosing the carbon fiber layer against the clamping ring the bracket being configured to engage a second bearing ring,
        wherein at least a portion of both the axial element and the radial element of the carbon fiber layer is clamped between the clamping ring and the bracket, and
        the annular shunt device, the bracket, and the carbon fiber layer are configured to provide an electrically conductive pathway between the first and second bearing rings.

2. The shunt assembly of claim 1, wherein an entirety of the radial element of the carbon fiber layer is contacted by both the clamping ring and the bracket.

3. The shunt assembly of claim 1, wherein a terminal end of the radial element of the carbon fiber layer contacts the annular shunt device.

4. The shunt assembly of claim 1, wherein the bracket and the carbon fiber layer are connected to each other via an epoxy.

5. The shunt assembly of claim 4, wherein the epoxy is electrically conductive.

6. The shunt assembly of claim 4, wherein the clamping ring is radially spaced away from the annular shunt device.

7. The shunt assembly of claim 1, wherein the carbon fiber layer contacts an axial element of the shunt device.

8. The shunt assembly of claim 1, wherein an interface between the carbon fiber layer and the shunt device is only provided via contact with the axial element of the shunt device.

9. The shunt assembly of claim 1, wherein an axial element of the shunt device includes a plurality of protrusions directed radially inward and configured to engage the carbon fiber layer.

10. The shunt assembly of claim 1, wherein the shunt device is formed from steel and is coated with a silver layer.

11. The annular shunt device of claim 1, wherein the plurality of through slots are circumferentially spaced about a central radial portion and define between 20% and 50% of the central radial portion.

12. The annular shunt device of claim 1, wherein the clamping ring is positioned radially inward from an inner diameter of the annular shunt device.

13. The annular shunt device of claim 1, wherein the shunt device has a C-shaped cross-sectional profile.

14. A bearing assembly comprising:
an outer ring;
an inner ring;
a plurality of rolling elements disposed between the outer ring and the inner ring;
a bearing cage for securing each of the plurality of rolling elements disposed between the outer ring and the inner ring on an axially inward side of the plurality of rolling elements; and
a shunt assembly located on an axially outer side of the plurality of rolling elements including:
an annular shunt device, formed from a conductive material, having a plurality of through slots configured for passing lubricant to the rolling elements;
a clamping ring seated within an inner diameter of the annular shunt device and;
a carbon fiber layer seated on a radially inner surface and an axially outer surface of the clamping ring, the carbon fiber layer contacting the annular shunt device; and
a bracket partially enclosing the carbon fiber layer against the clamping ring.

15. The bearing assembly of claim 14, wherein the annular shunt device is pressed against a radial surface of the outer ring and wherein the annular shunt device is pressed against an axial surface of the outer ring.

16. The bearing assembly of claim 14, wherein the bracket is pressed against the inner ring.

17. The bearing assembly of claim 14, wherein the annular shunt device, the carbon fiber layer, and the bracket are configured to establish an electrical passage between the inner ring and the outer ring.

18. The bearing assembly of claim 14, wherein the bearing assembly is an open bearing.

19. The bearing assembly of claim 14, wherein the carbon fiber layer is spaced away from the outer ring and spaced away from the inner ring.

20. The bearing assembly of claim 14, wherein the shunt device includes:
a first axial element;
a central radial portion connected to the first axial element; and
a second axial element connected to the central radial portion to define a generally C-shaped cross-section; and
wherein the carbon fiber layer includes a radial element and an axial element, wherein the radial element contacts the second axial element of the shunt device.

* * * * *